US 8,554,411 B2
(12) United States Patent
Ura

(10) Patent No.: US 8,554,411 B2
(45) Date of Patent: Oct. 8, 2013

(54) ELECTRIC POWER STEERING SYSTEM

(75) Inventor: Noritake Ura, Anjo (JP)

(73) Assignee: Jtekt Corporation, Osaka (JP)

( * ) Notice: Subject to any disclaimer, the term of this patent is extended or adjusted under 35 U.S.C. 154(b) by 328 days.

(21) Appl. No.: 12/828,527

(22) Filed: Jul. 1, 2010

(65) Prior Publication Data

US 2011/0010051 A1    Jan. 13, 2011

(30) Foreign Application Priority Data

Jul. 13, 2009  (JP) ................................. 2009-165014

(51) Int. Cl.
*A01B 69/00* (2006.01)
(52) U.S. Cl.
USPC ............. 701/41; 180/446; 180/422; 180/444; 180/168; 180/412; 180/443; 180/445; 180/234; 180/410; 180/272; 318/432; 318/433; 318/434; 340/441; 340/439
(58) Field of Classification Search
USPC ........................................................ 701/41
See application file for complete search history.

(56) References Cited

U.S. PATENT DOCUMENTS

| 4,621,327 A | 11/1986 | Dolph et al. |
| 2002/0177932 A1 | 11/2002 | Kifuku et al. |
| 2006/0076182 A1 | 4/2006 | Kifuku et al. |
| 2007/0236186 A1 | 10/2007 | Patterson |

FOREIGN PATENT DOCUMENTS

| EP | 0 896 422 A1 | 2/1999 |
| EP | 1 826 899 A1 | 8/2007 |
| JP | A-2001-128482 | 5/2001 |
| JP | A-2006-331086 | 12/2006 |

OTHER PUBLICATIONS

Diss.Wishart, Jeffrey Daniel. Modelling, simulation, testing, and optimization of advanced hybrid vehicle powertrains. University of Victoria (Canada), ProQuest, UMI Dissertations Publishing, 2008. NR41215.*
Search Report issued in corresponding European Patent Application No. 10170924.4, mailed on Sep. 28, 2010.
Extended Search Report issued in corresponding European Patent Application No. 10169240.8 dated Feb. 10, 2011.
Copending U.S. Appl. No. 12/833,341 to Ura, filed Jul. 9, 2010.

* cited by examiner

*Primary Examiner* — Ryan Zeender
*Assistant Examiner* — Fawaad Haider
(74) *Attorney, Agent, or Firm* — Oliff & Berridge, PLC

(57) ABSTRACT

In an electric power steering system, an ECU 11 includes two independent microcomputers 17a, 17b that serve as motor control signal generators, and the microcomputers 17a, 17b perform the same current feedback computation. Switching arms 20a, 20b that constitute a driving circuit 18 operate independently of each other, based on motor control signals generated by the corresponding microcomputers 17a, 17b. Each of the microcomputers 17a, 17b determines whether an absolute value of a current deviation of an actual current I (I1, I2) from a current command value exceeds a predetermined threshold value. If the current deviation exceeds the threshold value, it is determined that an abnormality occurs in the system.

6 Claims, 5 Drawing Sheets

ELECTRIC POWER STEERING SYSTEM

INCORPORATED BY REFERENCE

The disclosure of Japanese Patent Application No. 2009-165014 filed on Jul. 13, 2009, including the specification, drawings and abstract, is incorporated herein by reference in its entirety.

BACKGROUND OF THE INVENTION

1. Field of the Invention

The invention relates to an electric power steering system.

2. Description of the Related Art

An electric power steering (EPS) system using a motor as a driving source has been proposed as one type of power steering systems for vehicles. The EPS system is characterized by a high degree of flexibility in the layout thereof and a small amount of energy consumption. In recent years, therefore, the electric power steering system has been increasingly employed in a wide variety of vehicle types, from compact vehicles to large vehicles.

In the EPS system, numerous abnormality determining operations (diagnostics) are performed in information processing equipment (such as a microcomputer) that performs power assist control of the EPS system. For example, the microcomputer includes CPU and memories (RAM and ROM), and various types of electronic circuits (such as A/D converters). Upon start-up of the microcomputer (i.e., when the ignition key is turned on), an initial check is conducted so as to check if a memory that provides a storage space for a program under execution and its work data is normal. See, for example, Japanese Patent Application Publication No. 2006-331086 (JP-A-2006-331086). After start-up, too, it is checked if the microcomputer and various electronic circuits under control of the microcomputer function normally. If any abnormality is detected in the abnormality determination process, a fail-safe action or measure is immediately taken so as to ensure high reliability and safety.

In recent years, the EPS system is configured to perform various compensation controls in an attempt to achieve more excellent steering feeling, resulting in an increase in the capacity or storage of the memory and an increase in the time required for the initial check. Also, the function checks after start-up are conducted by a monitoring microcomputer provided independently of a main microcomputer that implements power assist control. In this case, the main microcomputer has to carry out test computations sent from the monitoring microcomputer, in real time. Furthermore, the provision of new monitoring circuits (abnormality determination circuits), including the monitoring microcomputer, makes it necessary for the main microcomputer to check if the monitoring circuits function normally. Thus, the processing power required to perform the abnormality determination process keeps growing or increasing, which is a cause of increase in the manufacturing cost.

In addition, the provision of a large number of monitoring circuits leads to a significant increase in the failure rate due to an increase in the number of elements of the system. Also, since abnormality determinations are made over a wide range of phenomena, even a trivial phenomenon, which would hardly affect the operation of the EPS system, may be determined as an abnormality. If such an abnormality is counted as a failure, the failure rate may be further raised or increased, as one example of problems caused by the provision of the monitoring circuits. In this respect, too, there is still room for improvement.

SUMMARY OF INVENTION

An object of the invention is to provide an electric power steering system that solves the above-described problems.

An aspect of the invention relates to an electric power steering system has a steering force assist device that provides assist force for assisting a steering operation, to a steering system, using a motor as a driving source, and a controller that controls the operation of the steering force assist device. The controller includes a control signal generator that generates a motor control signal so as to produce a motor torque corresponding to the assist force, and a driving circuit that supplies driving electric power based on the motor control signal, to the motor. The control signal generator calculates a current command value representing a target assist force, based on a detected steering torque, and performs a current feedback computation so that an actual current value follows the current command value, thereby to create the motor control signal. The driving circuit is formed by connecting switching arms in parallel with each other, each of the switching arms comprising a pair of switching devices connected in series and operable to be turned on or off based on the motor control signal. The controller has two control signal generators that perform the same current feedback computation, as the above-indicated control signal generator, and the two switching arms corresponding to motor terminals operate independently of each other, based on the motor control signals generated by the respective control signal generators, so that the driving electric power is supplied to the motor. The controller has an abnormality determining unit that determines that an abnormality occurs when a current deviation of an actual current value from the current command value exceeds a predetermined threshold value in at least one of the control signal generators.

With the above arrangement, the control signal generators perform the same current feedback computation, based on the quantities of state detected with respect to common objects. Accordingly, the control signal generators provide the same computation result as long as there is no abnormality in the two control systems. By operating the switching arms in synchronism with each other, based on the motor control signals generated by the respective control signal generators, it is possible to supply electric power to the motor in the same manner as in a hypothetical case where only one of the control signal generators performs control by itself.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

One embodiment of the invention will be described with reference to the drawings.

Figure 1:
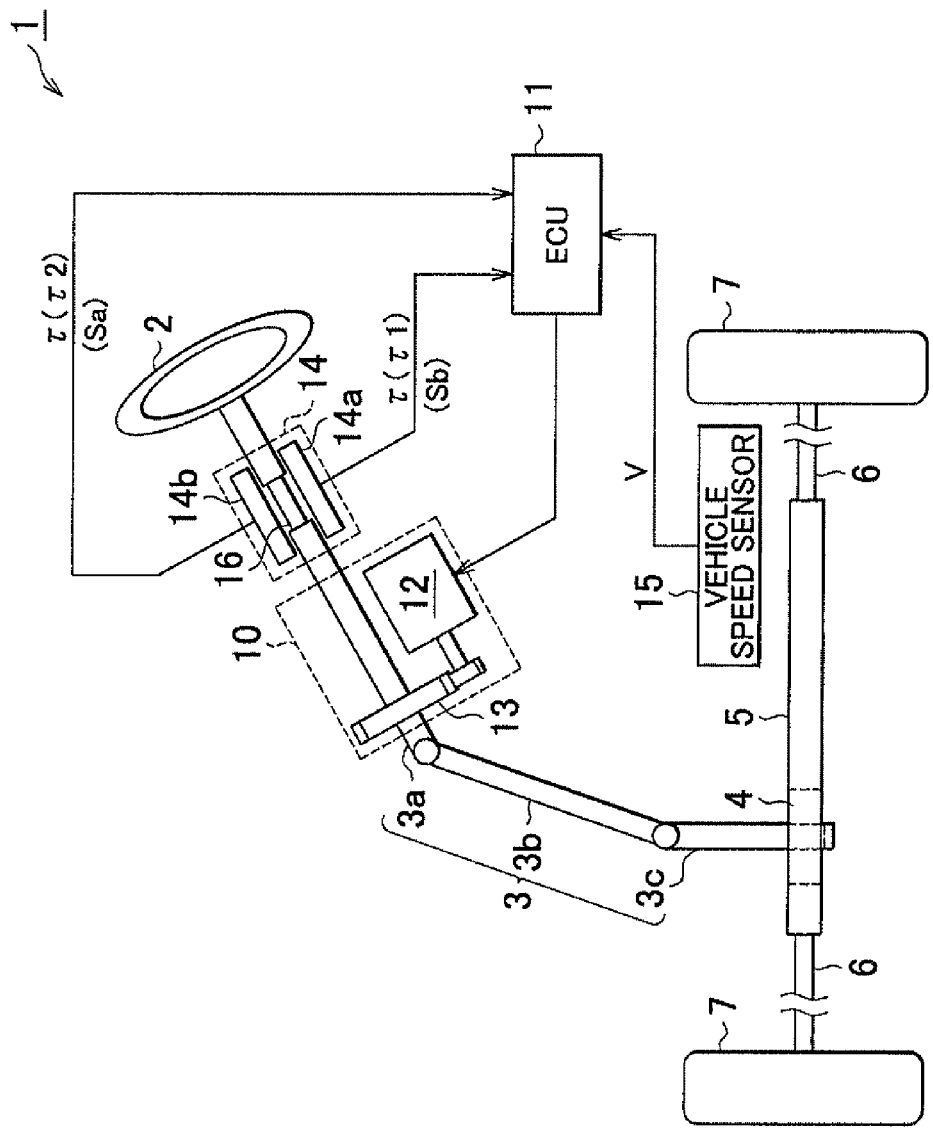
FIG. 1 is a schematic view showing the construction of an electric power steering (EPS) system.

As shown in FIG. 1, in an electric power steering (EPS) system 1 according to the embodiment, a steering shaft 3 to which a steering wheel 2 is fixed is coupled to a rack shaft 5 via a rack-and-pinion mechanism 4, and rotation of the steering shaft 3 caused by a steering operation is converted into reciprocating linear motion of the rack shaft 5 by means of the rack-and-pinion mechanism 4. The steering shaft 3 includes a column shaft 3a, an intermediate shaft 3b, and a pinion shaft 3c, which are coupled to each other. The reciprocating linear motion of the rack shaft 5 originating from the rotation of the steering shaft 3 is transmitted to knuckles (not shown) via tie rods 6 coupled to the opposite ends of the rack shaft 5, so as to change the turning angles of steered wheels 7, or the traveling direction of the vehicle.

The EPS system 1 also includes an EPS actuator 10 that serves as a steering force assist device for providing assist force to a steering system so as to assist a steering operation, and an ECU 11 that serves as a controller for controlling the operation of the EPS actuator 10.

The EPS actuator 10 is configured as a column-assist-type EPS actuator in which a motor 12 as a driving source is operatively coupled to the column shaft 3a via a reduction gear 13. A known worm-and-wheel gear is employed as the reduction gear 13. The motor 12, which is in the form of a brushed DC motor, is operable to rotate based on driving electric power supplied from the ECU 11. The EPS actuator 10 is arranged to reduce the rotational speed of the motor 12, and transmit the resulting rotation to the column shaft 3a, thereby to provide the motor torque as assist force to the steering system.

A torque sensor 14 and a vehicle speed sensor 15 are connected to the ECU 11. The torque sensor 14 includes a torsion bar 16 provided somewhere in the column shaft 3a, and two independent sensor units 14a, 14b each capable of detecting a steering torque τ transmitted via the steering shaft 3, based on the torsion of the torsion bar 16. The sensor units 14a, 14b generate sensor signals (Sa, Sb) representative of the detected steering torques.

For example, the torque sensor may be formed by placing two or more Hall ICs, as the sensor units 14a, 14b serving as sensing elements, around a sensor core (not shown) that causes a change in the magnetic flux based on the amount of torsion of the torsion bar 16. See, for example, Japanese Patent Application Publication No. 2003-149062 (JP-A-2003-149062). The ECU 11 controls assist torque generated by the motor 12 as the driving source of the EPS actuator 10, based on the steering torque τ(τ1, τ2) detected by the torque sensor 14, and the vehicle speed V detected by the vehicle speed sensor 15, thereby to perform power assist control.

Next, an electrical arrangement of the EPS system of this embodiment will be described.

Figure 2:
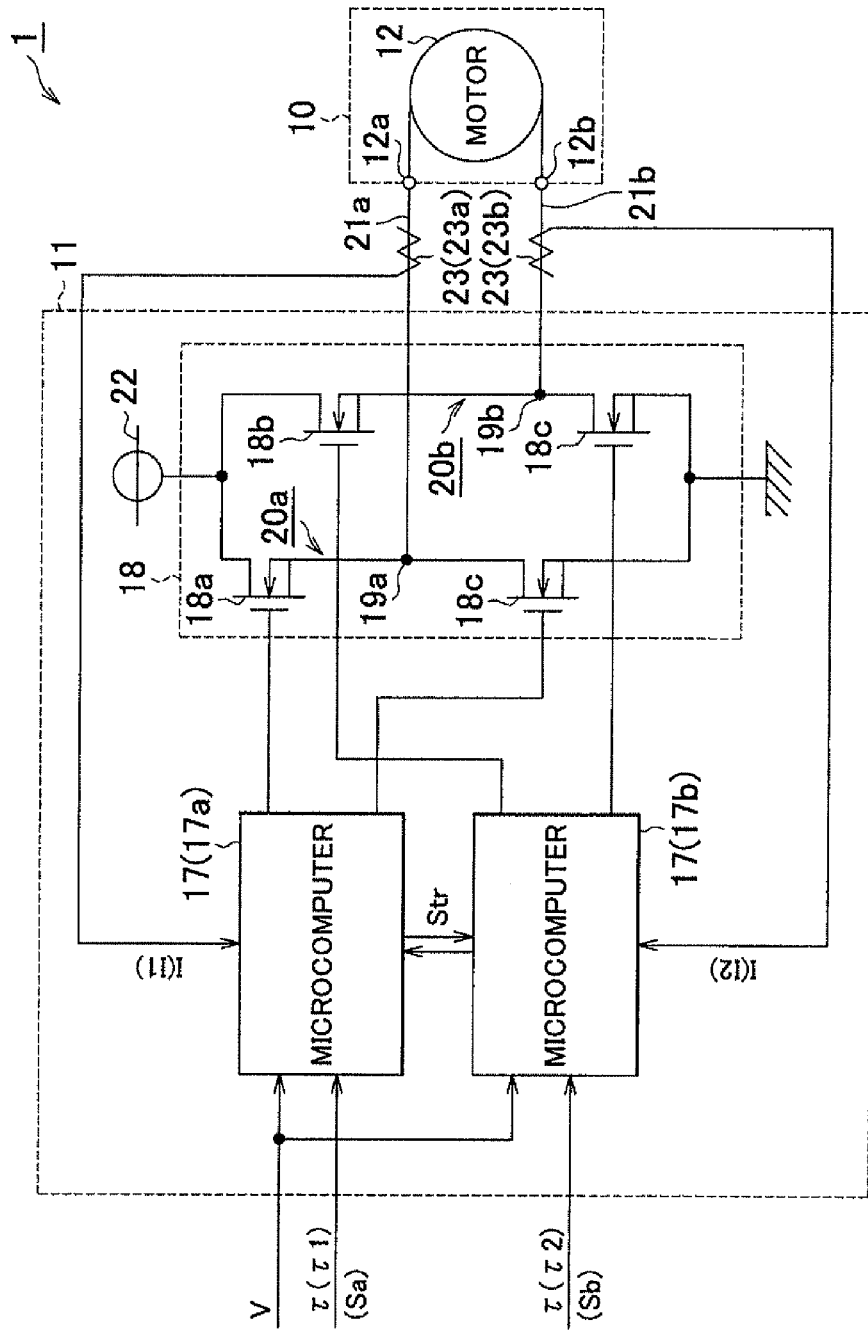
FIG. 2 is a block diagram showing an electrical arrangement of the EPS system.

FIG. 2 is a control block diagram of the EPS system. As shown in FIG. 2, the ECU 11 has microcomputers 17 (17a, 17b) that serve as motor control signal generators for generating motor control signals, and a driving circuit 18 that supplies driving electric power to the motor 12 based on the motor control signals generated by the microcomputers 17.

The driving circuit 18 is configured as a known H-bridge-type PWM inverter in which a series circuit consisting of a pair of FETs 18a, 18c and a series circuit consisting of a pair of FETs 18b, 18d are connected in parallel with each other, and a connection point of the FETs 18a, 18c and a connection point of the FETs 18b, 18d form output terminals 19a, 19b, respectively.

The driving circuit 18 includes two switching arms 20a, 20b that are connected in parallel with each other, each of the switching arms having a pair of switching devices connected in series, as a basic unit, and the two output terminals 19a, 19b are connected to corresponding motor terminals 12a, 12b via power lines 21a, 21b, respectively. The motor control signals generated by the microcomputers 17 (17a, 17b) are gate on/off signals that specify the switching states of the respective FETs 18a to 18d that constitute the driving circuit 18.

By turning on/off the respective FETs 18a to 18d in response to the motor control signals received as the gate on/off signals, the driving circuit 18 converts the power supply voltage of a battery 22 into a voltage corresponding to the duty ratio represented by the motor control signals. Then, the controlled voltage is applied to the motor terminals 12a, 12b, so that driving electric power having a desired direction of current flow is supplied to the motor 12.

The ECU 11 has two independent microcomputers 17a, 17b as signal control generators. The switching arms 20a, 20b that constitute the driving circuit 18 are arranged to operate independently of each other, according to the motor control signals generated by the corresponding microcomputers 17a, 17b.

Initially, each of the microcomputers 17a, 17b calculates a target assist force to be applied to the steering system, based on the steering torque τ detected by the torque sensor 14 and the vehicle speed V detected by the vehicle speed sensor 15.

More specifically, the microcomputer 17a receives a sensor signal Sa generated by the sensor unit 14a as one of the two sensor units 14a, 14b that constitute the torque sensors 14, and the microcomputer 17b receives a sensor signal Sb generated by the sensor unit 14b. The microcomputers 17a, 17b detect the steering torques τ1, τ2 independently, based on the sensor signal Sa, Sb received from the corresponding sensor unit 14a, 14b.

Each of the microcomputers 17a, 17b has a map (not shown) in which the target assist force is associated with the vehicle speed V and the steering torque t, and each microcomputer 17a, 17b calculates the target assist force based on the map. In this embodiment, the microcomputers 17a, 17b receive common values representing the vehicle speed V. Each of the microcomputers 17a, 17b calculates the target assist force, based on the detected vehicle speed V and steering torque τ(τ1, τ2), such that the target assist force becomes larger as the vehicle speed V is lower, and becomes larger as the steering torque τ is larger.

Current sensors 23 for detecting actual current values I of the motor 12 are connected to the ECU 11. Each of the microcomputers 17a, 17b is configured to calculate the motor control signal, by performing a current feedback computation so that the detected actual current value I follows a current command value (I*) corresponding to the target assist force.

More specifically, two current sensors 23a, 23b are respectively provided in the two power lines 21a, 21b that connect the output terminals 19a, 19b of the switching arms 20a, 20b with the motor terminals 12a, 12b, respectively. The microcomputer 17a receives an output signal of the current sensor 23a provided in the power line 21a, as one of the two current sensors 23a, 23b, and the microcomputer 17b receives an output signal of the current sensor 23b provided in the power line 21b.

The microcomputers 17a, 17b individually detect the actual current values I1, I2 of the motor 12, based on the output signals of the corresponding current sensors 23a, 23b. Then, the microcomputers 17a, 17b are configured to perform the same current feedback computation, independently of each other, based on the actual current values I1, I2, so as to implement the power assist control.

Figure 3:
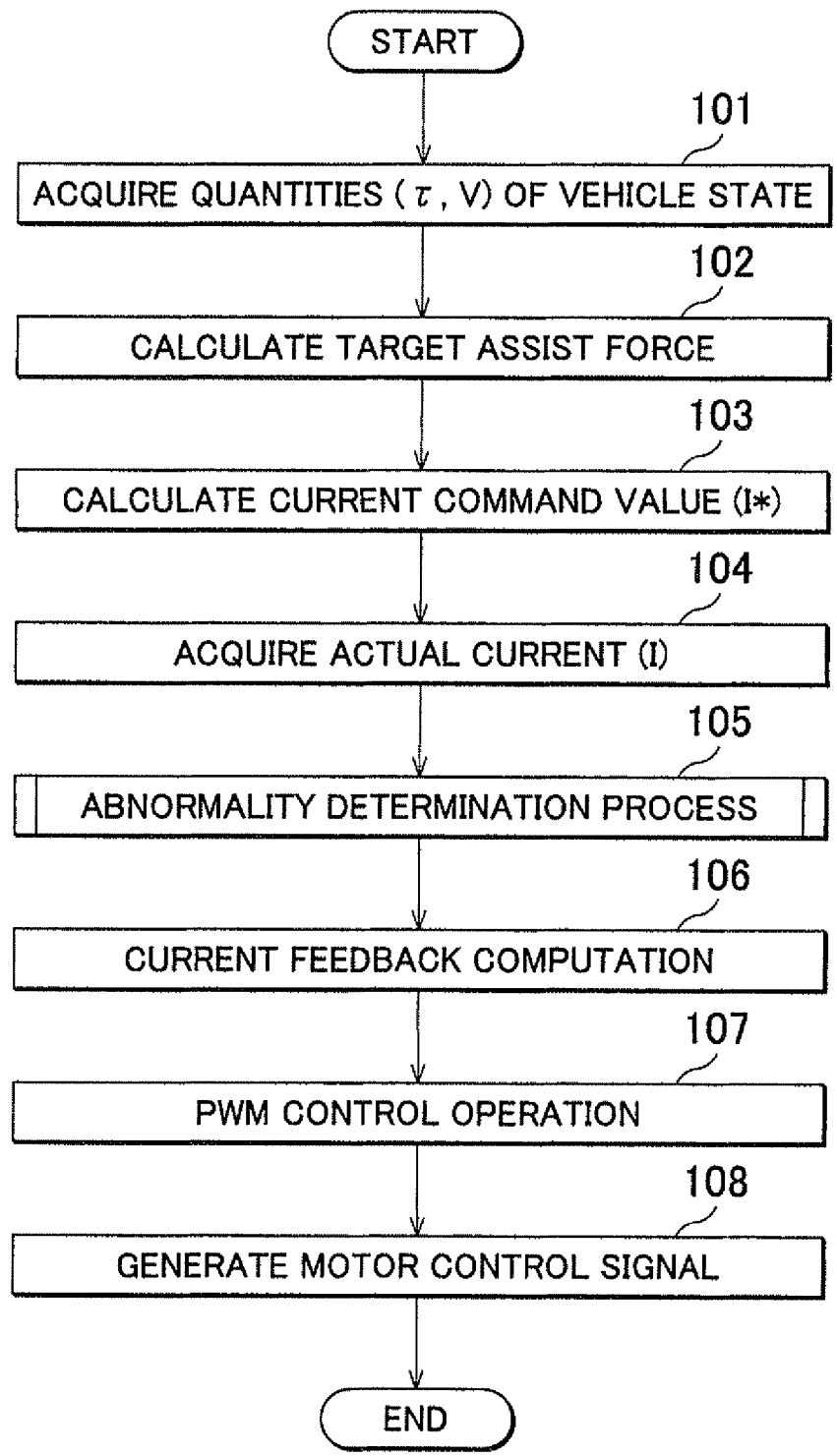
FIG. 3 is a flowchart illustrating a control routine of power assist control.

Specifically, as shown in the flowchart of FIG. 3, the microcomputer 17 (17a, 17b) initially acquires the steering torque τ(τ1, τ2) and the vehicle speed V (step 101), calculates a target assist force based on these quantities of state of the vehicle (step 102), and calculates a current command value I* corresponding to the target assist force (step 103). Then, the microcomputer 17 acquires the actual current value I (step 104), and executes an abnormality determination process that will be described later (step 105).

The microcomputer 17 performs a current feedback computation so that the detected actual current value I follows the current command value I* corresponding to the target assist force (step 106). The current feedback computation is performed through proportional integral control using a proportional term obtained by multiplying a current deviation of the actual current value I acquired in the above step 104 from the current command value I* calculated in the above step 103 by a proportional gain, and an integral term obtained by multiplying an integral value of the current deviation by an integral gain. A duty ratio corresponding to the result (voltage command value) of the above-described current feedback computation is calculated through execution of a PWM control operation (step 107), and gate on/off signals having the thus calculated duty ratio are generated as motor control signals (step 108).

Thus, each of the microcomputers 17a, 17b inherently has the ability to generate motor control signals to all of the FETs 18a to 18d that constitute the driving circuit 18, and control the operations of the FETs, by itself.

In the EPS system 1 as shown in FIG. 2, however, the microcomputer 17a generates its motor control signals only to the FETs 18a, 18c of the switching arm 20a, as one of the two switching arms 20a, 20b that constitute the driving circuit 18. Also, the microcomputer 17b generates its motor control signals only to the FETs 18b, 18d of the switching arm 20b. Namely, the switching arms 20a, 20b operate independently of each other, based on the motor control signals generated by the corresponding microcomputers 17a, 17b.

Figure 4:
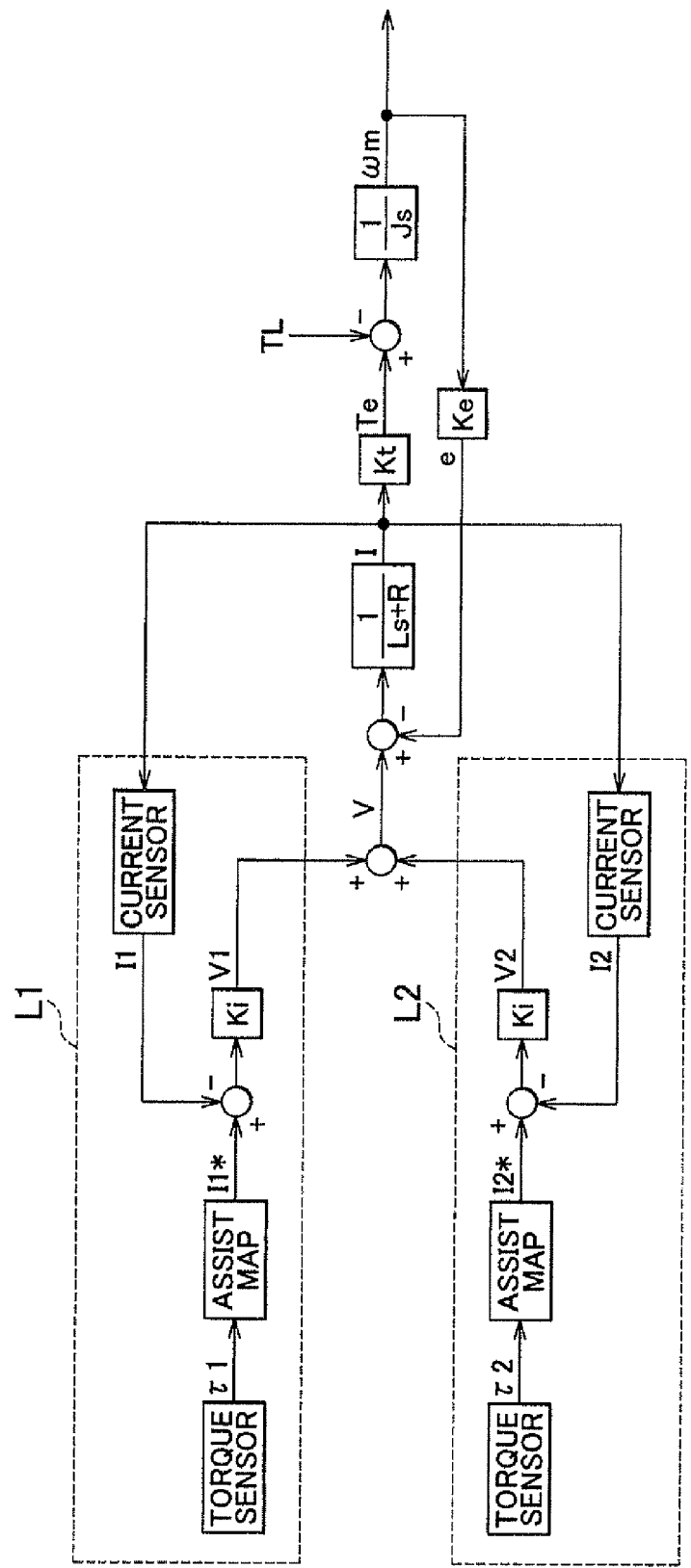
FIG. 4 is a block diagram of motor control in the EPS system according to an embodiment.

As shown in the block diagram of FIG. 4, the EPS system 1 has a double system, i.e., two independent systems (portions surrounded by broken lines L1, L2 in FIG. 4) each performing the process of detecting the main quantities (τ, I) of state used in a current feedback computation for implementation of power assist control, performing the current feedback computation, and applying the resulting voltage to each of the motor terminals 12a, 12b. The symbols and quantities of state in FIG. 4 are generally used in block diagrams of motor control, and therefore, will not be described in detail.

Although the above two control systems are independent of each other, the two systems have common objects (the torsion bar 16 and the motor 12) with respect to which the quantities of state as a basis of the control are detected, and perform the same current feedback computation.

Accordingly, even where the object to be controlled by each of the microcomputers 17a, 17b is limited only to a corresponding one of the switching arms 20a, 20b (the FETs 18a, 18c or FETs 18b, 18d), as in this embodiment, the operation of the driving circuit 18 can be controlled in the same manner as in a hypothetical case where the driving circuit 18 is controlled solely by one of the microcomputers 17a, 17b, as long as each control system is normal. With this arrangement, the ECU 11 is arranged to supply driving electric power to the motor 12.

In the arrangement in which the two microcomputers 17a, 17b independently control the operations of the switching arms 20a, 20b, respectively, when a difference arises in the results of current feedback computations performed by the respective microcomputers 17a, 17b, the actual current value I of the motor 12 is controlled according to the motor control signals indicative of the smaller amount of current to be passed through the motor 12, irrespective of which of the computation results is correct. The ECU 11 has an abnormality determining function of determining an abnormality in the system, utilizing this arrangement.

For example, when current is passed through the motor 12 from the motor terminal 12a to the motor terminal 12b, the microcomputer 17a generates a motor control signal for turning on the high-potential-side FET 18a of the switching arm 20a, and the microcomputer 17b generates a motor control signal for turning on the low-potential-side FET 18d of the switching arm 20b. In this case, in order to prevent the emergence of flow-through current, the low-potential-side FET 18c of the switching arm 20a and the high-potential-side FET 18b of the switching arm 20b are turned off.

As discussed above, the microcomputers 17a, 17b perform the same current feedback computation, based on the quantities of state detected with respect to the same objects. Thus, the results of computation are the same as long as there is no abnormality in the two control systems (see FIG. 4). In this case, the switching arms 20a, 20b corresponding to these microcomputers 17a, 17b operate in synchronism with each other, based on the motor control signals received from the microcomputers 17a, 17b, so that electric power is supplied to the motor 12 in the same manner as in the hypothetical case where each of the microcomputers 17a, 17b controls the driving circuit 18 by itself.

If any abnormality occurs in one of the two control systems, a difference will arise between the results of the current feedback computations performed by the respective microcomputers 17a, 17b. If the microcomputer 17a generates a motor control signal that indicates that X should be generated as the actual current value I of the motor 12, and the microcomputer 17b generates a motor control signal that indicates that Y should be generated as the actual current value I (X>Y), for example, the actual current value I of the motor 12 will follow the smaller one, i.e., Y.

Namely, the switching arm 20a corresponding to the high-potential-side motor terminal 12a, i.e., the FET 18a that operates according to the motor control signal output of the microcomputer 17a, is provided with the on-time (turn-on time) that permits generation of a motor current equivalent to the above-indicated X. On the other hand, the on-time (turn-on time) of the switching arm 20b corresponding to the motor terminal 12, or the FET 18d that operates according to the motor control signal output of the microcomputer 17b, is only such a length that permits generation of a motor current equivalent to Y that is smaller than the above-indicated X. When there is a difference between the results of current feedback computations performed by the microcomputers 17a, 17b, the ECU 11 makes a system abnormality determination, based on a current deviation that appears on the side that generates the motor control signal indicating that the larger actual current value I should be generated.

Described in more detail, the microcomputers 17a, 17b individually calculate the current command values I*, and detect the actual current values (I1, I2) of the motor 12, as described above. Each of the microcomputers 17a, 17b carries out an abnormality determination process (see FIG. 3, step 104 to step 106), based on a current deviation of the actual current value I from the current command value I*.

Figure 5:
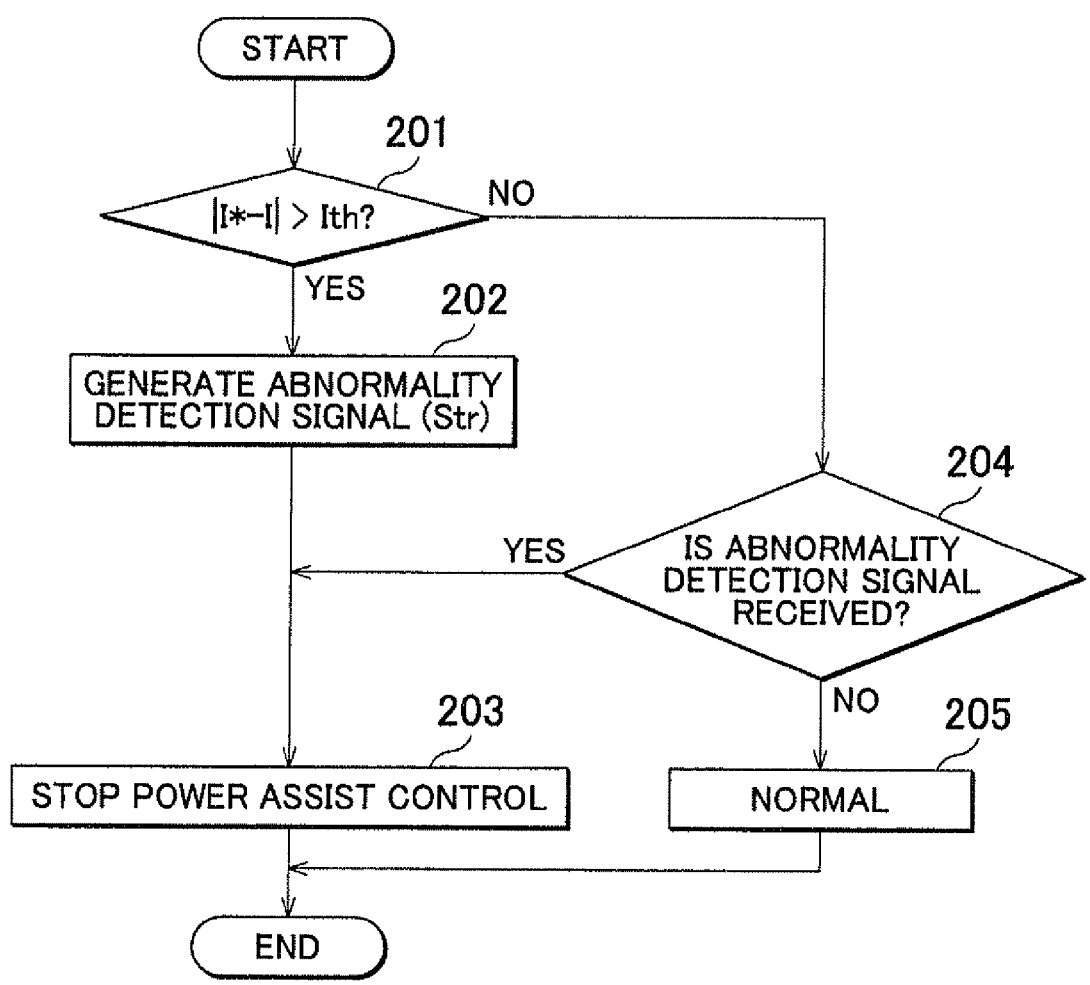
FIG. 5 is a flowchart illustrating a process of making an abnormality determination.

More specifically, as shown in the flowchart of FIG. 5, each of the microcomputers 17a, 17b serving as an abnormality determining unit determines whether an absolute value of a current deviation of the actual current value I (I1, I2) from the current command value I* exceeds a predetermined threshold value Ith (step 201). If the current deviation exceeds the threshold value Ith (|I*−I|≤Ith, YES in step 201), an abnormality detection signal Str that indicates that an abnormality is detected in the system is generated to the other microcomputer (step S202), and execution of the power assist control is stopped (step 203).

If it is determined in the above-indicated step 201 that the absolute value of the current deviation of the actual current value I (I1, I2) from the current command value I* is equal to or smaller than the predetermined threshold value Ith (|I*−I|≤Ith, NO in step 201), the microcomputer 17 determines whether it receives an abnormality detection signal Str from the other microcomputer (step 204). If the abnormality detection signal Str is received (YES in step 204), execution of the power assist control is stopped (step 203).

If it is determined in the above-indicated step 204 that no abnormality detection signal Str is received (NO in step 204), it is determined that the system is normal, and the power assist control is continued (step 205).

The present embodiment provides the following effects.

1) The ECU 11 includes the two independent microcomputers 17a, 17b serving as motor control signal generators, and the microcomputers 17a, 17b perform the same current feedback computation. The switching arms 20a, 20b that constitute the driving circuit 18 operate independently of each other, based on motor control signals generated by the corresponding microcomputers 17a, 17b. Each of the microcomputers 17a, 17b determines whether the absolute value of the current deviation of the actual current value I (I1, I2) from the current command value I* exceeds the predetermined threshold value Ith. If the current deviation exceeds the threshold value Ith, it is determined that any abnormality occurs in the system.

The microcomputers 17a, 17b perform the same current feedback computation, based on the quantities of state detected with respect to the common objects. Therefore, the microcomputers 17a, 17b provide the same computation result as long as there is no abnormality in the two control systems. In this case, the switching arms 20a, 20b operate in synchronism with each other, based on the motor control signal outputs of the respective microcomputers 17a, 17b, so that electric power can be supplied to the motor 12 in the same manner as that in the hypothetical case where each of the microcomputer 17a, 17b controls the driving circuit 18 by itself.

When an abnormality occurs in at least one of the two independent control systems formed by the microcomputers 17a, 17b, a difference arises between the results of the current feedback computations. As a result, the actual current value I of the motor 12 is controlled according to the motor control signal indicative of the smaller amount of current to be passed through the motor 12, irrespective of which of the computation results is correct, and a current deviation appears on the side that generates the motor control signal indicating that the larger actual current value I should be generated. According to this arrangement, it is possible to make an abnormality determination with high reliability, with a simple arrangement, by monitoring the current deviation.

In particular, when an abnormality that occurs in the microcomputer(s) 17a, 17b has an influence on execution of the power assist control, the influence appears in the form of a current deviation in one of the microcomputers. If execution of the power assist control is stopped after detection of the abnormality, other abnormality determination control (monitoring circuit) concerning the microcomputers 17a, 17b, such as an initial check of a memory upon start-up of the system as described above, may be eliminated, and replaced by the abnormality determination based on the current deviation. Consequently, not only the start-up time is reduced, but also cost reduction due to reduction of the processing power required of the microcomputers 17a, 17b and reduction of the failure rate due to scale-down of relevant circuits can be achieved.

Even in the event of occurrence of an abnormality, the actual current value I of the motor 12 is controlled according to the motor control signal indicative of the smaller amount of current to be passed through the motor; therefore, an excessive assist force is prevented from being generated upon the occurrence of the abnormality. Also, even in the case where one of the motor control signals indicates that the assist force should be applied in the reverse direction, the high-potential-side FETs 18a, 18b and low-potential-side FETs 18c, 18d of the switching arms 20a, 20 are turned on or off at the same time, namely, all of the devices in the upper stage or all of the devices in the lower stage are turned on, so that reverse assist force is prevented from being generated. Consequently, even higher reliability and improved safety are assured.

2) The microcomputers 17a, 17b detect the actual current values I1, I2 of the motor 12, independently of each other, based on the output signals of the corresponding current sensors 23a, 23b. With this arrangement, an abnormality that occurs in any one of the current sensors 23a, 23b also appears in the form of a current deviation as described above. Accordingly, a determination as to whether an abnormality occurs in the current sensor 23a, 23b may also be replaced or substituted by an abnormality determination based on the current deviation, resulting in a further simplified arrangement and further improved reliability.

3) The current sensors 23a, 23b are respectively disposed in the two power lines 21a, 21b that connect the respective output terminals 19a, 19b of the switching arms 20a, 20b that constitute the driving circuit 18, with the corresponding motor terminals 12a, 12b.

With the above arrangement, an abnormality that occurs in any one of the power lines 21a, 21b also appears in the form of a current deviation as described above, thus assuring a further simplified arrangement and further improved reliability.

4) The microcomputers 17a, 17b detect the steering torques τ1, τ2 independently of each other, based on the sensor signals Sa, Sb of two independent systems received from the torque sensor 14. Then, each of the microcomputer 17a, 17b calculates a current command value I* corresponding to the target assist force, based on the steering torque τ(τ1, τ2).

With the above arrangement, an abnormality that occurs in the torque sensor 14 also appears in the form of a current deviation as described above. Accordingly, a determination as to whether an abnormality occurs in the torque sensor 14 can be replaced or substituted by an abnormality determination based on the current deviation, resulting in a further simplified arrangement and further improved reliability.

5) The torque sensor 14 has the torsion bar 16 provided somewhere in the column shaft 3a, and two independent sensor units 14a, 14b each operable to detect the amount of torsion of the torsion bar 16, i.e., the steering torque τ transmitted via the steering shaft 3, and generate a sensor signal Sa, Sb representing the detected steering torque.

Thus, the mechanical arrangement of the torque sensor including the torsion bar is highly likely to be extremely rugged. The use of the torque sensor in which only the electrical arrangement has a double system makes it possible to simplify the arrangement while assuring sufficiently high reliability.

The above-described embodiment may be modified as follows.

In the above-described embodiment, the invention is embodied as a column assist type EPS system. However, the invention is not limitedly applied to the EPS system of this type, but may be embodied as a pinion assist type or rack assist type EPS system.

In the above-described embodiment, one current sensor 23 (23a, 23b) is provided in each of the two power lines 21a, 21b, and the microcomputers 17a, 17b detect the actual current values I1, I2, independently of each other, based on the output signals of the corresponding current sensors 23a, 23b. It is, however, to be understood that the invention is not limited to this arrangement, but the microcomputers 17a, 17b may use a common actual current value I provided that the current is detected with sufficiently high reliability. In this case, only one current sensor may be provided in the system. Furthermore, the location of the installation of the current sensors is not limited to the power lines 21a, 21b, but the current sensor (s) may be connected in series with the driving circuit 18.

In the above-described embodiment, the torque sensor 14 including the two independent sensor units 14a, 14b operable to detect the steering torque τ and generate sensor signals Sa, Sb, respectively, is used, and the microcomputers 17a, 17b detect the steering torques τ1, τ2, independently of each other, based on the corresponding sensor signals Sa, Sb. However, the invention is not limited to this arrangement, but two independent torque sensors may be provided, and may be arranged to transmit respective signals to the corresponding microcomputers. Also, the microcomputers 17a, 17b may use a common value as the steering torque provided that the torque can be detected with sufficiently high reliability.

If an abnormality in the system is determined by making an abnormality determination based on a current deviation, it is preferable to provide two independent current sensors 23a, 23b, and cause the microcomputers 17a, 17b to receive the corresponding output signals of the current sensors 23a, 23b, and sensor signals Sa, Sb of two independent systems capable of detecting the steering torques τ, as indicated in the above-described embodiment. It is thus preferable that the microcomputers 17a, 17b individually calculate current command values, based on the steering torques τ1, τ2 detected based on the respective sensor signals Sa, Sb, and individually perform current feedback control, based on the actual current values I1, I2 detected by the respective current sensors 23a, 23b.

Namely, the process of detecting the main quantities of state (τ, I) used in the current feedback computation for executing power assist control, performing the current feedback computation, and applying the resulting voltage to the motor terminals 12a, 12b is implemented by the double system, i.e., two independent systems (see FIG. 4), so that any of the abnormalities that occur in the main system for providing assist force appears as a current deviation or is determined by detecting a current deviation. Consequently, other abnormality determination control (monitoring circuits) may be eliminated, for simplification of the arrangement, while assuring high reliability in the detection of abnormalities.

While the microcomputers 17a, 17b constitute the abnormality determining unit in the illustrated embodiment, the abnormality determining unit may be provided independently. However, the arrangement of the illustrated embodiment is more preferable, in terms of simplification of the arrangement and the accompanying benefits, such as reduction of the failure rate due to scale-down of relevant circuits.

Next, technical ideas that can be grasped from the above-described embodiment, along with their effects, will be described.

In the electric power steering system, each of the current sensors is provided in each of the power lines that connect the respective motor terminals with the corresponding switching arms. With this arrangement, an abnormality that occurs in the power lines also appears as a current deviation, thus assuring further simplification of the arrangement and improved reliability.

In the electric power steering system, the torque sensor is adapted to generate sensor signals of two systems each capable of detecting the steering torque based on the amount of torsion of the torsion bar provided in the steering shaft. Namely, the mechanical arrangement of the torque sensor including the torsion bar is highly likely to be rugged. Thus, the use of the torque sensor in which only the electrical arrangement has a double system makes it possible to simplify its arrangement or construction, while assuring sufficiently high reliability.

What is claimed is:

1. An electric power steering system comprising:
a steering force assist device that provides assist force for assisting a steering operation, to a steering system, using a motor as a driving source; and
a controller that controls the operation of the steering force assist device, wherein
the controller includes
a control signal generator that generates a motor control signal so as to produce a motor torque corresponding to the assist force, and
a driving circuit that supplies driving electric power based on the motor control signal, to the motor, wherein
the control signal generator calculates a current command value representing a target assist force, based on a detected steering torque, and performs a current feedback computation so that an actual current value follows the current command value, thereby to create the motor control signal, wherein
the driving circuit includes switching arms that are connected to each other in parallel, each of the switching arms comprising a pair of switching devices connected in series and operable to be turned on or off based on the motor control signal, wherein
the controller has two independent control signal generators that perform the same current feedback computation as the control signal generator, and the two switching arms corresponding to motor terminals operate independently of each other based on the motor control signals generated by the respective control signal generators, so that the driving electric power is supplied to the motor, and wherein
the controller has an abnormality determining unit that determines that an abnormality occurs when a current deviation of an actual current value from the current command value exceeds a predetermined threshold value in at least one of the control signal generators.

2. The electric power steering system according to claim 1, further comprising two current sensors, wherein each of the control signal generators performs the current feedback computation, based on an actual current value detected by a corresponding one of the current sensors.

3. The electric power steering system according to claim 1, wherein
the controller receives sensor signals of two systems each capable of detecting the steering torque, and
the control signal generators calculate the current command values independently of each other, based on the steering torques detected based on the corresponding sensor signals.

4. The electric power steering system according to claim 2, wherein:
the controller receives sensor signals of two systems each capable of detecting the steering torque, and
the control signal generators calculate the current command values independently of each other, based on the steering torques detected based on the corresponding sensor signals.

5. The electric power steering system according to claim 1, wherein
the controller receives sensor signals of two systems each capable of detecting the steering torque, and
the control signal generators, based on the steering torque detected by different systems of the two systems, calculate the current command values independently of each other.

6. The electric power steering system according to claim 1, wherein
when the abnormality determining unit determines that an abnormality has occurred, the actual current value is controlled according to the motor control signal generated by the control signal generator that calculates a lower current command value.

* * * * *